United States Patent [19]

Burley

[11] 4,055,529
[45] Oct. 25, 1977

[54] ADHESIVE JOINT DRESSING COMPOSITIONS CONTAINING AN ALKALI THICKENABLE POLYMER

[75] Inventor: David R. Burley, Cranbury, N.J.

[73] Assignee: Tile Council of America, Inc., Princeton, N.J.

[21] Appl. No.: 572,660

[22] Filed: Apr. 29, 1975

[51] Int. Cl.$^2$ .............................................. C08L 33/02
[52] U.S. Cl. .................. 260/29.6 RW; 260/29.6 WB; 260/29.6 E
[58] Field of Search ............. 260/29.6 RW, 29.6 WB, 260/29.6 E

[56] References Cited

U.S. PATENT DOCUMENTS

| 3,035,004 | 5/1962 | Glavis | 260/29.6 RW |
| 3,037,881 | 6/1962 | McDowell | 260/29.6 RW |
| 3,300,429 | 1/1967 | Glavis et al. | 260/29.6 WB |
| 3,421,277 | 1/1969 | Frischmuth | 260/29.6 WB |
| 3,487,031 | 12/1969 | Muroi et al. | 260/29.6 RW |
| 3,687,885 | 8/1972 | Abriss et al. | 260/29.6 RW |
| 3,810,859 | 5/1974 | Mikofalvy | 260/29.6 RW |
| 3,845,066 | 10/1974 | Vasta | 260/29.6 WB |
| 3,894,980 | 7/1975 | DeTommaso | 260/29.6 RW |
| 3,931,085 | 1/1976 | Drelich et al. | 260/29.6 RW |

OTHER PUBLICATIONS

Davidson et al., *Water-Soluble Resins* Reinhold, NY, pp. 156–157, 1962.

*Primary Examiner*—M. J. Welsh
*Attorney, Agent, or Firm*—Morgan, Finnegan, Pine, Foley & Lee

[57] ABSTRACT

Adhesive dressing compositions are disclosed which are useful in restoring and improving adhesive joint surfaces such as grout surfaces in ceramic tile installations by easy, efficient methods. Such compositions form stain resistant, water repellent, washable coverings which adhere to most adhesive surfaces and further have properties of preferential adherability to certain adhesive surfaces compared with adjacent adherend surfaces. The compositions comprise a polymer in the form of an emulsion, an alkali-thickenable polymer, an alkaline material and water with other components including pigments, plasticizers and solvents.

30 Claims, No Drawings

ADHESIVE JOINT DRESSING COMPOSITIONS CONTAINING AN ALKALI THICKENABLE POLYMER

BACKGROUND OF THE INVENTION

The restoration and preservation of hard surfaces generally utilizes the technology of the cleansing art which includes soaps and detergents; the solvent treating art; and coating or paint technology. In fact, to properly renew as well as protect surfaces, treatments often include application of various compositions which require tiem-consuming preparations, sequential treatments, and careful handling and application of the compositions. This is particularly the case where the surface to be treated is adjacent to another surface which does not require the treatment. Examples of such surfaces include tiling or paneling where only the adhesive joint surfaces between the pieces or panels require treatment. Such surfaces may be found in the household, as in furniture such as on table tops, flooring, and walls; and on outdoor surfaces, such as on boats; and in the point of bricks or other construction blocks.

The term adhesive, as used to describe the composition of such joint surfaces, generally refers to a substance capable of holding materials together by surface attachment, such as cementitious materials and polymeric resins including, for example, organic resins and silicone resins. The materials held together by the adhesive are termed adherends. The adhesive joint is also referred to as a grout, particularly when describing the joints between tile and other construction materials. Typical grouting compositions are described, for example, in U.S. Pat. No. 2,934,932 issued to Wagner and U.S. Pat. No. 3,706,696 issued to Bernett et al.

Examples of adherends which are attached to each other by an adhesive joint include structural clay products including brick, soaps, Slaughterhouse tile, glazed and unglazed clay block and non-Portland cement-containing structural products such as plastic, metal, fiberglass, glass plate, etc. Other adherends include glazed and unglazed wall tile, quarry tile, glazed and unglazed ceramic mosaics, and glazed floor brick. The adhesive joints may consist of, for example, Portland cement, mastic grout and epoxy materials.

The adhesive material used to form an adhesive joint generally is chosen for its strength and for its ability to form a strong bond to the surface of the adherend. The adhesive usually contains large quantities of filler materials which add bulk to the adhesive as well as improving its workability in applying it to the surface and increasing its strength. While the inculsion of fillers has these and other advantages, it also causes the adhesive jont to form a rough surface with many crevices, often rendering the joint surface porous to liquids and highly vulnerable to picking up diret and discoloration.

A grouting composition commonly employed in the ceramic tile industry is that of the Portland cement type. Such compositions suffer from several undesirable properties For example, the cement-type grouts are generally rough textured and porous thereby collecting dirt and other matter and allowing the transpiration of water. The grout surface is reactive and it readily discolors and stains thereby detracting from its original aesthetic or decorative appearance. The grouts are not readily avaliable in decorative colors to match or contrast with the ceramic tile. In addition, they often act as an environment for microorganisms. A well known example of such grouts is that found in bathroom tile installations.

While treatment of such joint surfaces with cleaning agents or solvents offers a temporary solution to the problem, because of the nature of these surfaces, they are quickly apt to become dirty and require often and repetitive treatments. Moreover, such cleaning agents offer no aid in preserving the compositons in the joints.

In the past, the renewal of grout joints entailed the removal of the grouting material by mechanical means, such as scratching and scraping, followed by re-installation of a similar material. This is expensive and time consuming and does not solve the basic problem of poor performance. The same problem will recur since the same type of grouting composition was re-installed.

On the other hand, coatings and paints which offer a protective coating for the joint surfaces require difficult and tedious applications to prevent the coating of the adjacent surfaces. Removal of such coating material from the adjacent surfaces often require delicate cleaning methods with noxious chemicals. As a result, devices for applying such coatings to very limited surface areas have been developed. These devices range from the very familiar caulking gun to more sophisticated devices like "Tileliner" manufactured by White Line, Inc., of Atlanta, Georgia. "Tileliner" has a special applicator which comprises a small vial filled with a liquid of the consistency of paint. A special rubber cap device with an applicator wheel is attached to the vial. The wheel is rolled along the joint, effectively covering the surface area of the joint in contact with the wheel. This technique still does not overcome the very tedious and timely application over large areas. Moreover, it is dependent upon the applicatior not clogging with the coating composition.

Additionally, the use of the applicator is also very limited by the size and shape of the joint to be coated. If the joint is narrower than the wheel width, the wheel does not touch the joint and the application is unsatisfactory. If the joint is wider than the wheel, a number of strokes with the applicator are required, resulting in a joint with an uneven appearance. If the joints are not straight, application is difficult. In all cases when the applicator comes to an intersection and crosses over a previously-applied area, it causes a raised area since it is thicker in this area than on either side of the intersection.

The coating composition used in the "Tileliner" as well as other known compositions are deficient in one or more respects. Many of these compositions cannot be applied over surfaces which are dirty or oily. In many cases the surfaces must first be extensively cleaned. As the joint surfaces are generally roughly textured and porous, many compositions do not obtain good bonds and adhesion with the substrate. Additionally, compositions have not heretofore existed which could provide an adhesive joint with acceptable water resistance, mildew proofing, and stain resistance. Many such compositions readily discolor and do not improve the aesthetic or decorative appearance of the adhesive joint. The aesthetic appearance not only includes color but also the texture of the coated surface.

For example, the composition used in the "Tileliner" when cured does not yield a glossy texture and does not resist stains such as permanent blue-black ink. Also, the coating will not adhere well to the substrate if the substrate is not meticulously clean and dry.

Another problem with such compositions is the difficulty in removing excess coating composition from adjacent surfaces. Removal requires use of special solvents. Not only are some of these solvents dangerous and odorous, but also remove some of the coating from the desired substrate.

SUMMARY OF THE INVENTION

The present invention relates to compositions which may be used as dressings capable of selectively adhering to substrate surfaces.

Compositions have now been discovered which can be formulated to have a consistency for easy application to adherable substrates and have properties for preserving and protecting the substrate as well as improving the aesthetic appearance of the adherable substrates. The compositions of the present invention are particularly adaptable for application to surfaces which are adjacent to other surfaces to which application of the dressing is not desired. Such a surface would be, for example, an adhesive joint surface which is the interface between two bodies held together by an adhesive.

The compositions of th present invention have the particular advantage of being adherable to most adhesive joint surfaces while the compositions are easily removed from the adjacent surfaces of many adherends. This is due to the discovery of their selective adherability, or their ability to adhere and bond to certain materials and not to others. This property provides easy cleanup and simplified application methods of the composition. The workable consistency of the composition may be modified to allow it to be applied to surfaces by a variety of techniques.

The adhesive substrates upon which the compositions of the present ivention have been found most successful are those having non-pourous surfaces which are indented or recessed below the surface of the adherends and porous surfaces which may be recessed or even or flush with the adherend surfaces.

The dressing composition of the present invention attaches to substrate surfaces by chemcial and/or by physical interaction. Chemcially reactive surfaces are generally most vulnerable to dirt and other contaminants in that they react with numerous every day materials leading to staining. However, the reactive properties of such surfaces are utilized in the present invention as the dressing compositions herein disclosed actually chemically react with these surfaces to form strong chemcial adhesive bonds and also neutralize the reactive properties of the surface to other materials. With respect to more inert substrate surfaces, the dressing composition herein disclosed have the ability to form strong adherent bonds although no chemcial reaction is detectable.

Another advantage of the composition of the present invention is that they can be formulated to provide the substrate with a protective covering, which covering when cured is relatively smooth textured, non-porous, stain resistant, water repellant, washable, mildew proof and has the ability of being applied in various decorative colors, as well as white. Moreover, the cured dressing is capable of withstanding attack from most common chemcial agents for at least short periods of time. It is also capable of having a second layer applied thereover.

It has additionally been discovered that the compositions of the present invention can be applied over wet or dry areas of newly-installed or old surfaces. The compositions generally may be applied over surfaces which are dirty. However, in some cases, nominal cleaning of the surface may be helpful where the dirt (eg. oil) is not well anchored to the substrate and will not be easily dispersed by water or where the dirt is a good pigment (eg. carbon black) which might discolor the dressing composition by mixing into it.

The compositions of the present invention have particular utility in the tile industry. Tiles of various materials are mounted and installed with adhesive materials forming joints or grouts between the edges of adjacent tile members. The compositions of the present invention are particularly suitable for application over many of the materials used as tile grouts, eg., mastic grouts. The compositions, upon being cured, maintain sufficient strength and withstand cracking of the surface.

For example, the compositions of the present invention have the ability to prevent the powdering and cracking of Portland cement grouts, particularly located on dry wall installations where the tile is installed in areas where it does not come into contact with water.

Another advantage of the present invention is its surprising ability to chemcially react with cementitious surfaces such as Portland cement grouts and form an exceedingly strong bond therewith.

A further advantage of the compositions of the present invention is their ability to quickly resist the pick-up of dust on their freshly applied, ucured, exposed surface even in dirty environments. In other materials not having this advantage, upon curing, the dirt remains on the surface and damages the appearance.

Accordingly, the present invention has the following objects:

It is an object of the present invention to provide a stable, one-part composition having a pleasant odor, which is non-poisonous, and which adheres to substrate surfaces and modifies and improves the aesthetic properties of the substrate surfaces, while retaining the approximate contour of the substrate surfaces.

It is another object of the present invention to provide a stable, one-part composition which adheres to substrate surfaces and which is capable of forming a protective layer over such surfaces which is stain resistant, washable, resistant to most chemical agents and non-porous to water.

It is still another object of the present invention to provide a dressing composition which is easy to remove from the substrate in its uncured state but which becomes resistant to removal when cured.

It is a further object of the present invention to provide a dressing composition which adheres to and forms strong bonds to some substrate surfaces and not to other surfaces.

It is a still further object of the present invention to provide a composition specially adaptable as a dressing for adhesive joint or grout surfaces, which composition when covering the joinnt or grout improves or modifies the aesthetic properties of the joint or grout surface and provides such surface with a covering which is stain resistant, washable, resistant to most chemical agents and non-porous to water.

It is an additional object of the present invention to provide a dressing composition which is protected by a microbicide.

It is another object of the present invention to provide a dressing composition which is easily applied by various techniques to both porous and non-porous substrates of varied dimensions which substrates may have flat or contoured surfaces and be either level, higher or recessed with respect to adjacent surfaces.

It is still another object of the present invention to provide a dressing composition which may be used in multiple coatings.

It is a further object of the present invention to provide an efficient and economical method for restoring and protecting substrate surfaces such as adhesive joints whether said joint surfaces are straight or curved or of uniform or non-uniform shape or width and further whether the adhesive joint has a varying depth below the surface of the adherend.

It is still another object of the present invention to provide a method of obtaining a smooth surface at the intersection of joint surfaces.

DETAILED DESCRIPTION OF THE PRESENT INVENTION

According to the present invention, there are provided dressing compositions capable of forming over substrate surfaces a non-porous, stain resistant, washable covering when cured, said composition comprising (i) a polymer in the form of an emulsion, said polymer may be selected from polymers of carboxylic acids, polymers of esters of carboxylic acids, and copolymers of a carboxylic acid or ester of a carboxylic acid with one or more monomers from the group comprising carboxylic acids, esters of carboxylic acids, acrylonitriles, acrylamides, aryls, alkenes and derivatives thereof, said polymer characterized as being room-temperature curable and forming a water-resistant film when cured; (ii) an alkali thickenable polymer capable of substantially increasing its viscosity as its pH is increased above neutral pH, said polymer may be selected from the group consisting of polymers of carboxylic acids, polymers of esters of carboxylic acids, and copolymers of a carboxylic acid or ester of a carboxylic acid with one or more monomers from the group comprising carboxylic acids, esters of carboxylic acids, acrylonitriles, acrylamides, aryls, alkenes and derivatives thereof, said polymer characterized as being room-temperature curable and forming a water-resistant film when cured; (iii) an alkaline agent present in sufficient amounts to thicken the alkalithickenable polymer; and (iv) water; wherein the dispersion of at least one of said polymer components becomes destabilized in the presence of polyvalent cations and wherein the total weight of polymer solids is in the range of 5–60% by weight of the total composition and wherein the composition has a thixotropic rheology and a viscosity which is greater than about 50,000 cps at 70° F.

Another feature of the present invention is to include in the dressing composition described immediately above a solvent which has the ability to reduce the time rate of film formation of the composition.

A further preferred feature of the present invention is to include in the dressing composition comprising components (i), (ii), (iii), and (iv) above, a pigment ingredient which is present in sufficient amounts to render the cured dressing with adequate opacity and desirable color to obscure the substrate on which it is applied.

A still further preferred embodiment of the present invention are dressing compositions comprising the components (i), (ii), (iii), and (iv) as described above further comprising a plasticizer.

Another preferred embodiment of the present invention are dressing compositions comprising the components (i), (ii), (iii), and (iv) as described above, further comprising a microbicide or mildewcide for inhibiting the growth of microbes such as bacteria and fungi both in the composition when stored and in the cured dressing.

A still further embodiment of the present invention is to provide a method for restoring, protecting and improving surfaces such as adhesive joints, said method comprising the steps of (i) applying the dressing compositions as described hereinabove; and (ii) removing excess composition from the surfaces adjacent to the treated surfaces.

An additional embodiment of the present invention is the method of converting or rendering the face surfaces of a tile-grout installation into one continuous water repellent, stain resistant surface.

Yet another embodiment of the present invention is a tile assembly comprising a plurality of tiles arranged in an edge-to-edge, spaced-apart relationship wherein said spaces form joints containing a cured grouting composition on which there is a layer of a dressing composition as hereinabove described.

The first ingredient in the composition is a polymer in the form of an emulsion which is stable in the alkaline environment of the composition itself, and is further stable in the sense of not degrading or depolymerizing when applied to such substrates as Portland cement-containing materials. Additionally, such polymers should be color-stable, that is able to withstand decolorizing or yellowing upon continued exposure to the alkaline environment, the generally to the conditions to which the dressing composition is applied. Such polymers cure at room temperature and form a water-resistant film. Moreover, such polymers should be easily combined with the other ingredients which may be included in the composition including the pigments.

One of the distinguishing properties of the polymer emulsion is that the emulsion system becomes unstable in the presence of polyvalent cations. This instability is not due to a degrading or depolymerization of the polymer itself, but rather to a breakdown in the emulsion phase wherein the microscopic droplets of the polymer no longer remain suspended in the liquid phase.

The emulsion state is a quasi stationary state in which the dispersion of an insoluble or slightly soluble liquid or solid polymer material is dispersed in a medium to low viscosity liquid phase. The polymer remains suspended or dispersed in the liquid phase either because parts of the polymer are soluble in the liquid phase, or an emulsifier additive is present, or by both means. Such an emuslifier forms a loose bridge or link between portions of the polymer molecule and the liquid dispersing medium aiding in stabilizing the dispersion of the polymer in the liquid phase.

A characteristic property of polymer emulsions useful in the present invention is that the stability of the emulsion is affected by the presence of polyvalent cations. Classic examples of polymers which form such emulsions are those having carboxylic acid pendant groups and/or are anionically dispersed.

An example of a polymer emulsion having this destabilizing property where the polymer constituent is anionically dispersed is Neoprene Latex LD2931-42 manufactured by DuPont & Nemours.

Examples of polymers in the form of an emulsion suitable in the composition of the present invention include those polymers derived from polymerizable carboxylic acids, esters of such carboxylic acids and copolymers of such carboxylic acids or esters of carboxylic acids with one or more monomers from aryl, alkene, acrylonitrile, acrylamide, other carboxylic acids and esters of carboxylic acids, and derivatives thereof. A preferred group of polymerizable carboxylic acids include substituted and unsubstituted alpha-olefinic monocarboxylic acids such as acrylic acid and methacrylic acid and their homologues. A preferred group of esters of said alpha-olefinic monocarboxylic acids would include the esters of said carboxylic acids with saturated aliphatic monohydric alcohols, eg. an alkyl acrylate. Specific examples of such materials are the acrylic emulsion polymers produced by the Rohm and Haas Company. These acrylic emulsion polymers are available under the tradenames "Rhoplex AC-61, Rhoplex LC-40, Rhoplex AC-707".

An examination of the instability of Rhophex AC-61 emulsion in the presence of calcium ions will be illustrative of the properties desirable in the polymer emulsion component. The addition of small amounts of calcium chloride solution (1.0 N) to the Rhoplex AC-61 aqueous emulsion causes the emulsion to break up as the polymer component apparently agglomerates forming cottage cheese-type curds which result in the polymer separating from the liquid phase.

Another essential component in the composition of the present invention is the alkali thickenable polymer. As this terminology suggests, this group of polymers is characterized as causing the composition to thicken yielding a substantial increase in viscosity as its pH is increased above about 8.5. This group of polymers is generally provided in the form of an aqueous sol, colloidal dispersion or emulsion of polymer particles, only partly in solution at near neutral pH. Although still dispersions, in some cases these polymers may be referred to as water soluble as they appear as "solutions" because the particle size of the polymer particles is below that visible to the eye. An acid monomer content of form 6 to 25% by weight of the polymer is usually adequate to sufficiently solubilize the polymer, but this may depend on the distribution of the acid groups in the polymer chain. A good discussion of the solubility of polymers is found in "The Chemistry of Organic Film Formers" by D. H. Solomon published by J. Wiley & Sons (1967) which is incorporated herein by reference.

The alkali thickenable polymers, like the emulsion polymers, must be compatible with the other components in the composition. For example, the polymers must not degrade or depolymerize in the presence of the other components, nor in the presence of such materials to which it may contact when used in the dressing compositions as herein described. Moreover, these polymers should be color stable and not yellow upon continued exposure to an alkaline environment.

However, a property distinguishing the alkali-thickenable polymer from the emulsion polymer is its ability to significantly increase the viscosity of the composition as its pH is increased above a certain point in the alkaline range. the actual means by which the polymer thickens at increased pH is not important although it has been noted that some polymers achieve this thickening because the alkalinity causes the polymer to swell and uncoil in its dispersing medium. The degree of thickening a polymer achieves at alkalinity depends upon the molecular weight of the polymer and the composition of the polymer including the number, distribution and nature of its pendant substituent groups.

The alkali-thickenable polymer may be similar to emulsion polymer component in that the stability of the emulsion or dispersion it forms may be affected by the presence of polyvalent cations. Generally, this property is not usually identified by the manufacturer of the polymer, as instability of a polymer in the form of a dispersion is considered, in most applications, an undersirable feature. Therefore, the emulsion or dispersion of the alkali thickenable polymer must be tested to determine its instability to polyvalent ions. The actual cause of this instability is not important. It may be due to, for example, the presence of acid pendant groups or the manner by which the polymer is dispersed.

One such test which has been formulated to determine the usefulness of certain alkali thickenable polymers includes the addition of calcium chloride solution to the subject polymer dispersion or emulsion to determine if the polymer dispersion is unstable. This is a similar test to that used to determine useful polymer emulsion ingredients. Such a test may be carried out by diluting 1.0 ml of a thickenable polymer such as Acrysol WS-50 with 100 ml of water. The optical density of such a solution is recorded. Then 1.0 N calcium chloride solution is added at a steady rate of 0.5 ml/min. The point of maximum change of optical density is determined. This change in optical density is caused by the precipitation of the polymer from the dispersing medium. This test is repeated to confirm the quantitative nature of the titration.

Some polymers not desirable in the present invention do exhibit precipitation in the presence of high levels of calcium ions. However, this precipitation does not yield a quantitative, reproducible, titration point because the precipitation is attributable to a phenomenon known as "salting-out".

The alkali thickenable polymer also resembles the emulsion polymer component in its general chemical make-up. It may also be derived from polymerizable carboxylic acids, esters of carboxylic acids, and copolymers of such carboxylic acids or esters of such carboxylic acids with one or more monomers from aryl, alkene, acrylonitrile, acrylamide, other carboxylic acids and esters of carboxylic acids or derivatives thereof. Preferred polymerizable carboxylic acids include substituted and unsubstituted alpha olefinic monocarboxylic acids.

Examples of useful alkali thickenable polymers include the Acrysol aqueous colloidal acrylics manufactured by the Rohm and Haas Comparny under such tradenames as WS-50, WS-32, WS-24 and ASE-60. Other polymers suitable as the alkali thickenable polymer include Carboset manufactured by the B. F. Goodrich Company.

Generally, the total weight of polymer solids in the uncured composition is in the range of 5–60% and preferably 10–40%. Of this polymer solid content, it is preferable to have at least 5% of the polymer solids be the emulsion polymers. The minimum amount of thickenable polymers present will depend upon the specific polymer used and the desired viscosity of the uncured composition. The uncured dressing preferably contains at least about 20% by weight volatile components.

Where resistance to water is desired in the final cured dressing composition, the water sensitivity of the alkali thickenable polymer must be considered.

Successful dressing compositions in accordance with the present invention have also been formulated wherein the dispersion of only one of the polymer components present in the composition, namely, either the emulsion polymer or the alkali thickenable polymer, is destablized by polyvalent cations. Moreover, the present invention contemplates the use of mixtures of polymer components, only some being destabilized.

An alkaline agent or base is utilized to increase the pH of the composition. Monobasic water-soluble alkaline agents are preferred. In some instances, it has been observed that polybasic molecules tend to react with some thickeners and produce a solid gel which synerizes. Also, polybasic agents contain polyvalent cations, which is present in the composition, could prematurely destabilize the emulsion polymer or thickener. While small amounts of polybasic compounds may be present, it is preferable to have at least one monobasic compound present as a contributing alkaline agent. Examples of such monobasic compounds include ammonium and alkali metal hydroxides and simple aliphatic amines. Properties which should be considered in choosing the alkaline agents include minimal odor, and properties which do not significantly effect the water sensitivty of the cured film (if such properties are desired) and do not interfere with the film formation. It is also desirable to use an alkaline agent which is volatile as long as it does not cause an unfavorable odor.

Certain of the water-soluble solvents can prevent the formation of the film prematurely. Useful water-soluble solvents have a vapor pressure at room temperature lower than that of water and therefore tend to reduce the rate of evaporation of liquid constituents of the composition. These solvents can also affect the viscosity and rheology of the composition. The water-soluble solvent is chosen so as not to detrimentally affect the other ingredients in the dressing composition nor affect the physical stability of the dressing composition.

Among the solvents found most useful in the present invention are the short-chain diols such as ethylene glycol and propylene glycol. These ingredients are also referred to as anti-drying aids. Not only do these solvents affect the film formation, but they also can function as pigment dispersers. Generally, ethylene glycol is the preferred diol although other diols may be used. Each of these solvents have differing properties and the amounts of each to be used in the composition must be determined on the basis of the properties desired.

The compositions of the present invention require relatively high quantities of volatile components and small amounts of non-volatile components, other than the polymer binders. As the dressing composition cures, the volatile components from the composition evaporate. The composition, therefore, shrinks in volume, leaving a layer of dressing over the substrate sufficiently thin to cause the new dressing surface to approximate the contour of the substrate surface.

The cured dressing comprises the non-volatile components of the composition which are predominantly the polymer binders and the pigment when included in the compositions. To obtain the glossy finish of the cured dressing as well as the other advantages, a high binder to pigment radio is desired. Preferred pigment to binder weight ratios are at least 1:1.

There is little criticality in the choice of the pigment other than its stability at alkaline pH's and that it not react with the other components in the polymer dispersion system and should not cause precipitation or coagulation of the other ingredients.

Generally, those materials known in the adhesive and paint art as "pigments" are useful in the present composition. These pigments are in the form of small particles of up to about 15 microns in diameter. Examples of such pigments are titanium dioxide, light chromium green, yellow iron oxide, ASP-172, ASP-602, ASP-400P, Attagel 150, from Engelhard Industries, and 15 micron silica. Also contemplated within this class of pigments are those materials known as extenders. Extenders generally have a particle size larger than pigments, but they are sufficiently small to give the cured dressing composition sufficient opacity to render it aesthetically useful when applied to substrates.

The quantity and nature of the pigments affects the viscosity and workability of the uncured dressing composition. By the nature of the pigment is meant the density, surface area and wet out volume of the pigment. For a given amount of a pigment, a certain minimum quantity of polymer components referred to as the binder solids is necessary to assure satisfactory workability of the composition.

A helpful guide for determining the relationship of the pigment to other ingredients in the composition is the oil absorption value of the pigments as determined by ASTM D-281-31 spatula rub-out method.

The pigment in addition to coloring the composition may affect the temperature stability of the viscosity of the uncured composition. Generally, as the temperature increases, the viscosity of the composition decreases at a rapid rate. The presence of some pigments tend to increase this temperature dependence. Therefore, the properties of the composition may become very dependent upon the temperature where a pigment such as titantium dioxide is present alone as the pigment ingredient. It has been found that where such dependence is too extreme, the addition of a second pigment component such as attapulgite clay may reduce this temperature dependence while maintaining the desirable opacity.

As noted above, the compositions of the present invention also act as a physical preservative for the substrate surface by encapsulating and holding together the often loose granular substrate surfaces. The properties for accomplishing this purpose are enhanced by the presence of coalescing aids and plasticizers. Generally, the formation of the film is aided by the presence of solvents which soften the polymer component and allow them to coalesce at a lower temperature, or allow them to form a film more rapidly at a given temperature. These solvents or coalescing aids are sufficiently volatile, that after film formation, they leave the film by evaporation allowing the film to return to its original hardness. Where substances with low volatility are used, they remain in the film causing the film to remain soft. These latter substances which remain in the film are called plasticizers. Examples of coalescing aids include diacetone alcohol and Butyl Cellosolve, manufactured by Shell Chemical. Paraplex WP-1, manufactured by Rohm and Haas, is an example of a plasticizer.

It is often beneficial to include an ingredient to inhibit the growth of microbes such as bacteria and fungi materials both in the prepared composition and in the cured coating. Microbicides, including bcteriocides and mildewcides, are particuarly usable in the composition of the present invention. Useful materials include, for example, Nopcocide, manufactured by the Nopco Chemical Division of Diamond Shamrock Chemical Compnay, and Vancide, manufactured by Vanderbilt & Co.

Other polymers which do not form unstable emulsions in the presence of polyvalent cations may be included in the composition for purposes including improving the strength, water resistance, stain resistance, etc., of the cured composition.

The dressing composition of the present invention can be applied to various substrate surfaces by numerous conventional methods of application. As discussed above, the dressing composition can be applied not only to flat surfaces but also to curved or contoured surfaces of varying sizes and shapes which are elevated, flush or recessed with respect to adjacent surfaces.

As indicated above, the dressing composition bonds better to chemically reactive surfaces, such as surfaces containing cememtitious materials, than to non-reactive surfaces due to the presence of chemical bonding in addition to physical bonding. Therefore, joint surfaces containing such reactive materials, whether they be flat or contoured, or recessed or flush with the adherend surface, are excellent substrates for use with the dressing compositions.

The dressing composition also bonds well to less reactive or non-reactive substrate surfaces which are porous in that it forms good physical bonds with such surfaces. Such porous substrate surfaces may be flat or contoured or recessed or flush with the adherend surface and obtain excellent results.

Non-porous, non-reactive surfaces have also been found to act as good substrates for the dressing compositions where the surface is not perfectly flat and even or flush with the adherend surface. The dressing composition also bonds well to such non-porous, non-reactive surfaces and the other properties of the composition including its thixotropic rheology give it many advantages for easy and efficient application.

A preferred application of the composition of the present invention is its application over joint surfaces and adjacent surfaces which utilize the selective adherability properties of the compositions. As indicated above, selective adherability is generally the ability of the composition to form better bonds with certain surfaces than with other surfaces. For example, the dressing compositions form better bonds to chemically reactive surfaces, particularly those containing polyvalent cations, than to non-reactive surfaces. Therefore, where the joint substrate surface contains a reactive constituent such as a cememtitious material, the dressing composition will react chemically and form a better bond than to an adjacent adherend surface of a less reactive or non-reactive surface.

A similar example of where selective adherability of the dressing composition may be utilized is where the joint adhesive surface is more porous than the surface of the adjacent adherend. Again, the dressing composition will form a beter bond with the joint surface than the adherend surface allowing for easy clean-up of the composition from the adherend surface without wiping off the composition from the joints.

Typically, where an adherend-adhesive configuration is used, such as in the construction industry, a porous and/or reactive adhesive joint is adjacent to a non-porous, non-reactive adherend. Adherends such as tiles and other pieces used in floorings and wall coverings are highly glossed and non-reactive for long-lasting as well as aesthetic purposes. In comparison, the adhesive joint is typically more reactive and more porous. Examples of such adherend-adhesive configurations which utilize the selective adherability properties of the dressing compositions include: ceramic tile with Portland cement or mastic grout joints; glazed construction blocks with dry-set mortar joints; quarry tile with dry-set mortar joints.

As discussed above, the dressing composition of the present invention accomplishes more than the mere improvement of the aesthetic properties of adherend-joint configurations. The fact that the dressing compositions can render surfaces impenetrable to wear provides numerous other advantages and uses. For example, the dressing composition can convert a ceramic tile wall with porous cement joints into a continuously impervious surface. Essentially, the ceramic tile wall is converted into an installation which meets the building codes requiring this type of surface in wet areas.

Additionally, the smooth joint and tile surface make a surface to which dirt and germs have difficulty clinging and can be easily removed with routine cleaning. This is in contrast to the porous cement joints which are known to harbor germs and mildew, as well as dirt. Cleaning causes additional dirt and water to be absorbed from the cleaning agent into the joints making them dirtier. The application of the dressing composition improves the sanitary and durable nature of the installation.

The rheology and other physical properties of the dressing composition of the present invention allow it to be applied to substrates by a number of methods. The viscosity of the dressing composition is greater than 50,000 cps and less than 10,000,000 cps at 70° F and shows less than a factor of 100 change in viscosity at 120° F, never falling below 50,000 cps.

It has been found that the apparent viscosity of the composition is changed by the shear forces or pressure to which the composition is subjected during the manipulation for applying to the substrate surface. This rheology is evidenced as a change in the apparent Brookfied viscosity with spindle speed. A practical illustration of this rheology is that the amount of material delivered from a caulking tube in a given period of time varies when the applied pressure is changed.

The dressing composition with thixotropic rheologies are found to be most useful. Compositions with this rheology are manipulated easily under pressure, but remain in place once the pressure is removed. Generally, the compositions of this invention show apparent Brookfied viscosity ratios around 3 or 4when the 0.5 rpm value is compared with the 100 rpm value at 70° F. The actual value is not critical, but generally compositions with ratios approaching 1 or less would not be able to be applied easily since they may tend to wash out of the joints when the excess dressing is wiped or washed from the adherend surface.

One method for applying the grout dressing is by a "smear and wipe" technique. Bu this method, the dressing is applied with a damp sponge, with a cloth or by hand to the joint surfaces with portions of the dressing incidentally being applied also to the adjacent adherend. No special care is taken to shield or protect the adherend surfaces from the dressing. The dressing will not injure the surface of the adherend and the dressing is easily removed from its surface.

Other methods of application include, for example, trowelling; brushing, as with a paint brush; with a damp sponge or cloth material, or the hand; rolling, as with a paint roller; or extrusion, as with a toothpaste-type tube or caulk gun. The consistency of the composition enables it to be applied successfully by any of these techniques and others. Naturally, the choice of the particular technique will depend upon the size and shape of the area to be covered. Application methods may cover the adherend as well as leave a thick layer of uncured dressing over the joint. However, when washed, the excess dressing is removed from the adherend and excess dressing is removed from the joint, leaving a thin layer adhering to the joint surface.

The following examples are given to merely illustrate some of the preferred embodiments of the present invention.

EXAMPLE 1

Comparison of Alkaline Agents

As discussed above, it has been found that monobasic alkaline materials are superior to polybasic materials. The effect of different alkaline materials on the viscosity and thickening properties is illustrated by a comparison of the five compositions described in the table below as compositions A through E. These compositions are comparable in their chemical make-up except for the alkaline ingredient present in each. Compositions D and E, both containing mono-basic alkaline materials, had good, stable viscosities, and effectively thickened and formed a film when set on the substrate. Composition B did not thicken sufficiently to be applied to joint surfaces without running out. It is noted that the hexamethylene tetramine in composition B is not an alkaline agent, i.e., it does not form an alkaline solution with water. Composition C was too slow in thickening and did not obtain a desirable viscosity but rather formed a gel-like structure. This gel-like structure then formed a rubber-like mass by a phenomenon known as syneresis wherein the material contracts, squeezing out the liquid medium. Composition A thickened more rapidly than composition C and formed an even stiffer gel which became rubber-like upon syneresis without obtaining a desirable viscosity for application of the composition to the substrate.

| Component | A | B | C | D | E |
|---|---|---|---|---|---|
| AC-61 | 35.37 | 35.37 | 35.37 | 35.37 | 35.37 |
| WS-50 | 38.35 | 38.35 | 38.35 | 38.35 | 38.35 |
| Ethylene Glycol | 12.55 | 12.55 | 12.55 | 12.55 | 12.55 |
| Titanium Dioxide | 9.37 | 9.37 | 9.37 | 9.02 | 9.43 |
| Mildewcide | 0.19 | 0.19 | 0.19 | 0.14 | 0.14 |
| Plasticizer | 1.91 | 1.91 | 1.91 | 1.92 | 1.92 |
| Water | 1.29 | 1.29 | 1.29 | — | — |
| Diethylene Triamine | 1.01 | — | — | — | — |
| Hexamethylene Tetramine | — | 1.04 | — | — | — |
| Triethylene Pentamine | — | — | 1.12 | — | — |
| Ammonium Hydroxide(conc) | — | — | — | 1.81 | — |
| Sodium Hydroxide (33%) | — | — | — | — | 1.80 |

EXAMPLE 2

The data reported in the Table below shows the effect of the pigment and the extender ingredients on the viscosity of the dressing composition as a function of temperature.

The visosity is an important factor with respect to the method of applying the composition to the substrate. Moreover, substrates which have flat surfaces, i.e., not contoured, may not readily hold or receive coating compositions of low viscosities.

The addition of pigment (without the extender) to the mixture of film formers sharply increases the temperature dependence of the composition. This is illustrated by comparing compositions A with C and compositions E with F. The compositions A and E both contain the pigment and have viscosities varying more sharply with temperature than the comparable compositions C and F without the pigment. When extender is substituted for all or part of the pigment, as in compositions B and D, the viscosity of the compositions becomes less sensitive to temperature.

| Component | A | B | C | D | E | F |
|---|---|---|---|---|---|---|
| Acrylic Emulsion | 35.55 | 35.55 | 35.55 | 21.84 | 21.84 | 21.84 |
| Thickener | 38.55 | 38.55 | 38.55 | 47.80 | 47.80 | 47.80 |
| Anti-drying aid | 12.62 | 12.62 | 12.62 | 10.83 | 10.83 | 10.83 |
| Pigment | 9.42 | — | — | 8.31 | 15.66 | — |
| Extender | — | 9.42 | — | 7.35 | — | — |
| Mildewcide | 0.14 | 0.14 | 0.14 | 0.12 | 0.12 | 0.14 |
| Alkaline Agent | 1.81 | 1.81 | 1.81 | 1.82 | 1.82 | 1.82 |
| Plasticizer | 1.92 | 1.92 | 1.92 | 1.94 | 1.94 | 1.94 |

Viscosity (cps)

| Temp. | A | B | C | D | E | F |
|---|---|---|---|---|---|---|
| 65° | 530,000 | 780,000 | 900,000 | 2,760,000 | 2,300,000 | 2,340,000 |
| 70° | 360,000 | 660,000 | 640,000 | 2,080,000 | 1,780,000 | 1,780,000 |
| 85° | 180,000 | 370,000 | 280,000 | 1,220,000 | 860,000 | 900,000 |
| 105° | 50,000 | 180,000 | 170,000 | 540,000 | 340,000 | 580,000 |
| 120° | 20,000 | 110,000 | 100,000 | 390,000 | 220,000 | 420,000 |

EXAMPLE 3

The following composition was prepared as a batch on a Cowles Dissolver:

| | Wt in Grams |
|---|---|
| Acrysol WS-50 | 2,000.00 |
| Nopcocide N-96 | 80.00 |
| TiO$_2$- RANC | 80.00 |
| Ethylene Glycol | 120.00 |
| Diacetone Alcohol | 140.00 |
| Butyl Cellosolve | 140.00 |
| Defoamer | 0.50 |
| NH$_4$OH to pH of 9.0 | 42.00 |
| AC-61 | 2,000.00 |
| Hegman Grind Approximately 20 – 30 μ | |

This composition was used to dress cement grout joints which were discolored on a wall of glazed white wall tile. The composition was trowelled on the joints. The drying rate was slow enough to allow easy trowelling, but thin layers of the dressing which were allowed to dry were difficult to remove.

The appearance of the joints were improved. The white wall looked "new". When the composition dried, the application of permanent blue-black ink to the surface did not stain the dressing. The ink was wiped away with a damp cloth. Application of ink to untreated cement joints caused the formation of a spot which could not be removed by any cleansing method short of bleaching.

The above composition was tinted yellow with a yellow pigment dispersion. The pigment was just mixed in. The composition was applied to a wall of yellow tile with dirty joints. The effect was dramatic. The appearance of the whole wall was improved. Similar compositions were prepared having blue pigment and a brown (iron oxide) pigment. In each case the joints on which the dressings were applied yielded dramatic improvement in the aesthetic properties of the wall.

The compositions were also applied to a floor of ceramic mosaics with similar results obtained.

EXAMPLE 4

Preparation of a Pigmented Tile Grout Dressing

Pre-dispersed pigments may be incorporated in the dressing compositions to obtain the desired color. The following clear tile grout dressing composition was prepared by mixing the ingredients on the Cowles Dissolver.

| | |
|---|---|
| WS-50 | 794.0 |
| AC-61 | 892.0 |
| Mildewcide | 3.4 |
| Plasticizer | 53.2 |
| Ethylene Glycol | 147.9 |
| NH$_4$OH | 35.4 |
| | 1,925.9 grams |

It was noted that the Mildewcide ingredient was the most difficult component to disperse in the composition.

The composition obtained was clear to cloudy in appearance. This composition was applied by trowelling as a thin film onto the joints on a quarry tile panel. The panel had been grouted with a TEC Adhesives-Portland cement joint filler of brown color. The dressing composition yielded a glossy, clear layer over the joints which sealed the joint surface to water.

A. The clear tile grout dressing as described above was colored by mixing into it a small amount of Dutch Boy latex tinter of the burnt umber color. The resulting composition had a very even, uniform and deep color, and retained this color after being applied to Portland cement joints which initially had a dirty gray color.

B. An additive composition was prepared on a planetary mixer to which a pre-dispersed pigment mixture could be added. This additive composition comprised the clear tile grout dressing described above but excluding the mildewcide and ethylene glycol ingredients of the dressing. The mildewcide and ethylene glycol were instead mixed on a Cowles dissolver directly with the following pigment mixture:

| Source | Pigment | |
|---|---|---|
| American Cyanamid | Valencia Orange | 65 g |
| American Cyanamid | Cyan Green | 10 g |
| Pfizer | Pure Yellow Iron Oxide | 10 g |
| GAF | Permanent Yellow Suprapaste | 65 g |

This pigment mixture was then combined with the additive composition yielding a uniformly colored tile grout dressing which effectively achieved and maintained its satisfactory coloring when applied to a dirty gray cement-based tile grout.

EXAMPLE 5

Effect of Coalescing Aids or Plasticizers on a Tile Joint Dressing

A. A highly colored tile joint dressing, i.e., of high pigment content, was prepared on the Cowles dissolver containing the following ingredients:

| | Grams | Wt % |
|---|---|---|
| WS-50 | 2,000.0 | 42.4944 |
| Mildewcide | 8.0 | 0.1899 |
| Light Chromium Green | 200.0 | 4.259 |
| Ethylene Glycol | 400.0 | 8.550 |
| AC-61 | 2,000.0 | 42.4944 |
| Antifoam | 4.5 | 0.0960 |
| NH$_4$OH | 94.0 | 1.9972 |
| | 4,708.5 | 99.9997 |

This tile grout dressing had a deep chromium green color. It was applied by trowelling to cement joints on a section of wall tile. Upon drying, some cracking was evident on the cement joints coated with this dressing.

B. Diacetone alcohol was added to the dressing composition described in A above in an amount of 3% by weight of the above dressing. This composition was then applied to another section of cement joints on the wall tile. Upon drying, no cracks were observed in the areas covered with the tile grout dressing.

C. To the tile grout dressing composition described in A above was added 3% by weight of Paraplex WP-1. This tile grout dressing was then applied to another section of cement joints on the wall tile. Upon drying, no cracking occurred on the cement joints coated with the tile grout dressing.

When substantial quantities of pigment or other filler is contained in the tile grout dressing of the present invention, it is advantageous to include in the composition a coalescing agent or plasticizer to inhibit the cracking of the coating upon curing over the joint substrate surface.

EXAMPLE 6

This example concerns the effect of various water-soluble solvents on the viscosity and rheology properties of compositions of the present invention. Three compositions were prepared having the ingredients as described in the table below. Composition A contained ethylene glycol as the solvent; Composition C contained propylene glycol as the solvent; and composition B contained a mixture of both propylene glycol and ethylene glycol. From the viscosities of these compositions as reported in the table, it is clear that the different solvents render different viscosities to the composition.

| Component | A | B | C |
|---|---|---|---|
| Rhoplex AC-61 | 35.55 | 35.55 | 35.55 |
| Acrysol WS-50 | 38.55 | 38.55 | 38.55 |
| Titanium Dioxide | 9.42 | 9.42 | 9.42 |
| Plasticizer | 1.92 | 1.92 | 1.92 |
| Ethylene Glycol | 12.62 | 6.31 | — |
| Propylene Glycol | — | 6.31 | 12.62 |
| Ammonium hydroxide | 1.81 | 1.81 | 1.81 |

| Temperature | Viscosity (cps) | | |
|---|---|---|---|
| 65° | 580,000 | 256,000 | 184,000 |
| 70° | 360,000 | 200,000 | 160,000 |
| 85° | 180,000 | 179,000 | 72,000 |
| 105° | 50,000 | 24,000 | 16,000 |
| 120° | 20,000 | 8,000 | 8,000 |

EXAMPLE 7

This example concerns the effect of excluding from the composition of the present invention the polymer ingredient which is in the form of an emulsion. Two compositions were prepared and are described in the table below. Composition A did not contain any emulsion polymer. Composition B did not include any emulsion polymer but contained a different water-soluble solvent than in composition A. Composition C contained an emulsion polymer in accordance with the present invention and the same water-soluble solvent as present in composition A.

| Component | A | B | C |
|---|---|---|---|
| Rhoplex AC-61 | — | — | 35.55 |
| Acrysol WS-50 | 74.09 | 74.09 | 33.55 |
| Titanium Dioxide | 9.42 | 9.42 | 9.42 |
| Plasticizer | 1.92 | 1.92 | 1.92 |
| Ethylene Glycol | 12.62 | — | 12.62 |
| Propylene Glycol | — | 12.62 | — |
| Ammonium Hydroxide | 1.81 | 1.81 | 1.81 |

After preparation of this composition it was found that composition A immediately formed a hard, stiff gel and composition B formed a gel but less stiff or rigid than that formed by composition A. Composition C on the other hand formed a composition workable as a dressing and an evaluation of the viscosity of composition C yielded the following data:

| Temperature | Viscosity (cps) |
|---|---|
| 65° | 580,000 |
| 70° | 360,000 |
| 85° | 180,000 |
| 105° | 50,000 |
| 120° | 20,000 |

EXAMPLE 8

A test was run to determine the resistance of the dressing composition to extensive impact by water. The dressing composition C of Example 7 was applied to a Portland cement joint surface which was present between glazed ceramic tile on a panel. The panel was arranged in a position directly under a shower-type nozzle. The panel was then subjected to direct impact of water from the nozzle for a period of four hours. The water flowed at the rate of four gallons per minute on a surface of four square feet of panel. At the end of four hours, the grout dressing still firmly adhered to the substrate and appeared to suffer no damage.

EXAMPLE 9

The Dirt Resistance of the Tile Joint Dressing

One objective of this example is to determine at what point in time after application of the tile joint dressing on a cement grout that dirt does not adhere to the dressing surface. A panel was prepared of ceramic tiles mounted edge-to-edge and grouted with a cement-based grout. The tile grout dressing as described in Example 3 was applied to the grout surface. Dirt from under the roof deck of the research building of Tile Council of America was obtained. From this dirt sample, a portion which passes through an 80 mesh screen was separated and dried in an oven at 180° F. The dirt was then rubbed onto the tile and joints between the tile about 2 hours after the tile grout dressing was applied to the grout surface. An air compressor having 2–5 psi at the valve opening was then used to blow off excess dirt adhering to the surface of the tile and joints. This blower was directed at the surface for a period of 15 seconds. The joints on which the tile joint dressing was applied did not hold dirt.

EXAMPLE 10

Dressing Composition As A Covering For Large Porous Reactive Surfaces

The dressing composition as described in other examples for covering tile grouts was used for covering a cement block. Such a cement block is often used as a construction material in both the interior and exterior of buildings. The tile grout dressing as described in Exammple 3 is applied on one side of a cement block having the dimensions of 15½ inches × 17½ inches × 8½ inches. The dressing was allowed to cure on the cement block for one day. The block was then submerged into a pan of water. The untreated side of the block was found to absorb the water in the pan. The treated side did not absorb any water as the dressing effectively sealed the underlying porous cement block surface.

It was noted that after 24 hours of soaking, the treated surface was still dry and satisfactory.

EXAMPLE 11

This example describes the evaluation of various polymers to determine if they have the property of reactivity to polyvalent cations which is essential in either or both the emulsion polymer and the alkali thickenable polymer component.

1.0 ml of Acrysol WS-50 is diluted in 100 ml of water. The optical density of this liquid is determined and recorded to be in the 400–500 m$\mu$ range. 1.0 N calcium chloride solution is then added continuously to the Acrysol liquid at a steady rate of 0.5 ml/min. The point of maximum change of optical density was determined and found to correspond at the addition of 1.25 ml of the calcium chloride solution. The experiment was repeated and the endpoint of maximum change of optical density was determined as occurring when 1.27 ml of calcium chloride solution was added. The closeness in these results indicates the quantitative nature of the chemical reaction. Therefore, Acrysol WS-50 has the desired properties of reactivity in the presence of polyvalent cations.

Similar experiments were carried out with other alkali thickenable polymers and emulsion polymers. Those polymers in emulsion form that were stable to calcium chloride did not show a clear-cut endpoint. Any instability at high calcium levels was attributable to a physical phenomenon rather than a chemical reaction. Water soluble thickeners such as methyl cellulose did not show any instability at low calcium levels.

EXAMPLE 12

Composition E of Example 1 was evaluated to determine its rheology based upon the consistency and viscosity of the composition. The dressing composition was placed into a polyethylene tubular insert of a caulking gun. The insert was then assembled into the caulking gun and the dressing composition was extruded from a 1.9 mm orifice from the gun at various pressures. The weight of the material extruded at each pressure was recorded after 10 seconds. A measurement of the consistency (C) of the composition was calculated based upon the following formula:

$$C = \frac{1000}{\text{wt tile grout dressing extruded in 10 seconds}}$$

A plot of C versus pressure as illustrated in the table below shows a rapidly falling value of C with increasing pressure.

Viscosity is measured on the Brookfield viscosimeter with a TE spindle. The speed of rotation is varied and the apparent viscosity is measured. A comparison in the table below in the viscosity measurements and consistency measurements indicate an interrelationship. Both of these measurements demonstrate the thixotropic character of the dressing composition.

| Pressure psi | C | Spindle Speed | Viscosity |
|---|---|---|---|
| 5 | 625 | 2.5 | 260,000 |
| 10 | 196 | 5.0 | 176,000 |
| 20 | 95 | 10.0 | 110,000 |
| 40 | 25 | 20.0 | 75,000 |
| 60 | 9.5 | 50.0 | 31,000 |
|  |  | 100.0 | 6,000 |

EXAMPLE 13

Methods of Applying the Dressing Composition

A. For this example, a tile assembly was used comprising a plurality of glazed ceramic tiles arranged in an edge-to-edge, spaced-apart relationship wherein the spaces between the tiles form joints containing L & M Dry Cure Grout. This tile assembly or panel was four feet by six feet in size. A day after the assembly was grouted with the L & M Dry Cure Grout, these clean and dry cement joints were treated with the tile grout dressing composition C of Example 7. The dressing composition was applied from toothpaste-type tubes, by an extrusion method.

The tube was moved along the joint surface with the open end of the tube adjacent to the surface and with the tube continually being depressed by hand with approximately the same pressure. No unusual care was taken to be neat, i.e., some of the dressing smeared onto the surface of the adjacent tile.

The joints on which the dressing composition was applied were shaped using one's finger. The tile faces were then cleaned by washing the dressing from their surface with a firm, wet, cellulose sponge. The damp sponge was placed flat against the panel and wiped gently over the whole panel to remove the excess dressing. The dressing stayed on the joints although being easily washed from the tile face surfaces.

The joints were dusted with a damp cloth. The joints were found to be thoroughly dried within 12 hours and yielded a neat and clean panel with dressing only covering the joint surface.

B. A section of a wall of smoke gray tile grouted with L & M Dry Cure Grout was the subject for this Example. The wall was old and contained powdery surface dirt and mildew. The joints were washed with a mild detergent, flushed with clean water and allowed to dry thoroughly. The dressing composition C of Example 7 was applied over the dry joint surface using a caulking gun. The joints were completely covered with some of the composition smearing onto the tile surfaces.

A wet cellulose sponge was wiped against the tile wall, including the joint surfaces, removing excess dressing from the tile surface. After the dressing had essentially dried, the tile face surfaces were again dusted with a damp cloth. The dressing composition adhered completely over the joint surface while the tile surfaces were clean.

C. A wall comprising glazed ceramic wall tile grouted with a dry cure grout based on compositions as described in U.S. Pat. No. 2,934,932, was prepared for treatment with the dressing composition. The joints were covered with grease and oily-type soap substances. The joints were cleaned by scrubbing with a cleansing powder and a brush, then flushed with clean water and allowed to dry. The tile grout dressing was then applied to the dry grout surface by using a damp sponge and proceeding in a trowelling-like method. After the joints were covered by the dressing, the tile faces were washed removing the excess dressing from their surface. Thereafter, the tile surfaces were dusted with a damp cloth. Upon completion, the wall looked clean and neat with the dressing adhering only in the joint recesses of the wall leaving the tile faces clean.

D. A panel of 2⅜ inches × 2⅜ inches quarry tile was set with an emulsion-type mastic on gypsum wall board. The tile was grouted with a composition of two parts "D" sand and one part Portland cement. The joints were then dusted with pure gray Portland cement until the joints were flush with the adjacent tile surfaces. The joints were allowed to dry.

The joints were then covered by brushing the dressing composition C of Example 7 on the joint surfaces. The whole panel surface was then washed with a wet sponge. It was difficult to remove the dressing composition where it had covered excess cement which had peviously been rubbed into the tile. Except for this excess cement, the faces of the tile were easily cleaned while a layer of the dressing composition strongly adhered to the joint surface.

E. The following display panels were prepared over a substrate 18 inches × 24 inches of Transitop from Johns Mansville. The tiles on each of the panels were arranged in a herringbone pattern.

1. American Olean white crystalline glazed tile, Valencia Shape, grouted with dry set grout.
2. Interpace, 4¼ inches × 4¼ inches square edge tile grouted with dry set grout.
3. Summitville's Summitstones, Sunburst Series, tile grouted with two parts "D" sand and one part gray Portland cement, with joints subsequently dusted with gray Portland cement.
4. Wenczel Crystal Green, 4¼ inches × 4¼ inches tile grouted with dry set grout.

Dressing compositions were prepared in accordance with Example 3, including the addition of pigments to appropriately complement the tiles in these panels. Each dressing composition was appied to the respective panel by sponging. The panels were each washed with a wet sponge being wiped across the panel removing excess dressing from the tile faces. The panels were then dusted with a damp cloth.

All of the panels yield neat, clean panels with dressing composition adhering to the joint surfaces and leaving the tile surfaces clean.

What is claimed is:

1. A dressing composition capable of selectively adhering to substrate surfaces and forming on adherable substrate surfaces a non-porous, strain resistant, washable layer when cured, said composition comprising i. a high molecular weight polymer in the form of an emulsion which is alkali-thickenable whereby it is capable of substantially increasing the viscosity of the composition as the pH of the composition is increased above nertral pH;
ii. a high molecular weight polymer in the form of an emulsion which is not alkali-thickenable;
iii. an alkaline agent wherein the cation or cations of said agent are mono-valent, said alkaline agent present in sufficient amounts to cause the alkali-thickenable polymer to increase the viscosity of the composition; and
iv. water;

wherein both of said polymers are room temperature curable and form water resistant films when cured and wherein the dispersion of at least one of said polymers becomes destabilized in the presence of polyvalent cations whereby its emulsion phase is broken and the droplets of the polymer no longer remain suspended in the liquid phase and wherein the total weight of polymer solids is in the range of 5–60% by weight of the total composition, the volatile components comprising at least 20% by weight of the total composition and the composition having a thixotropic rheology with a viscosity greater than about 50,000 cps at 70° F.

2. The composition of claim 1 wherein both polymers become destabilized in the presence of polyvalent cations.

3. The composition of claim 1 wherein the non-alkali thickenable polymer in the form of an emulsion is anionically dispersed.

4. The composition of claim 1 further comprising a pigment in an amount wherein the weight ratio of the total polymer components to the pigment components is 1:1 or greater.

5. A dressing composition capable of selectively adhering to substrate surfaces and forming on adherable substrate surfaces a non-porous, stain resistant, washable layer when cured, said composition comprising
i. a high molecular weight polymer in the form of an emulsion which is not alkali-thickenable and which emulsion is destabilized in the presence of polyvalent cations whereby the droplets of the polymer no longer remain suspended in the liquid phase, said polymer selected from the group consisting of polymers of carboxylic acids, polymers of esters of carboxylic acids, and copolymers of a carboxylic acid or ester of a carboxylic acid with one or more monomers from the group consisting of carboxylic acids, esters of carboxylic acids, acrylonitriles, acrylamides, aromatic compounds and alkenes, said polymer characterized as being room-temperature curable and forming a water-resistant film when cured;
ii. a high molecular weight polymer which is alkali-thickenable whereby it is capable of substantially increasing the viscosity of the composition as its pH is increased above neutral pH, said polymer in the form of a colloidal dispersion or emulsion of polymer particles which dispersion or emulsion is destabilized in the presence of polyvalent cations, said polymer selected from the group consisting of polymers of carboxylic acids, polymers of esters of carboxylic acids, and copolymers of a carboxylic acid or ester of a carboxylic acid with one or more monomers from the group consisting of carboxylic acids, esters of carboxylic acids, acrylonitriles, acrylamides, aromatic compounds and alkenes, said polymer characterized as being room-temperature curable and forming a water-resistant film when cured;
iii. an alkaline agent wherein the cation or cations of said agent are mono-valent, said alkaline agent present in sufficient amounts to cause the alkalithickenable polymer to increase the viscosity of the composition; and
iv. water; wherein the total weight of polymer solids is in the range of 5–60% by weight of the total composition, and wherein the composition has a thixotropic rheology and a viscofity which is greater than about 50,000 cps at 70° F.

6. The dressing composition of claim 5 wherein volatile components of the composition comprise at least 20% by weight of the composition and the alkaline agent is present in an amount sufficient to adjust the pH of the composition to greater than 7.

7. The composition of claim 5 wherein at least 5% of the polymer solids comprise the non-alkali thickenable emulsion polymer (i).

8. The composition of claim 5 wherein the non-alkali thickenable polymer in the form of an emulsion is a polymer of an alpha-olefinic monocarboxylic acid.

9. The composition of claim 5 wherein the non-alkali thickenable polymer is a copolymer wherein at least one of the monomers is selected from the group consisting of acrylic acid, and esters of acrylic acid.

10. The composition of claim 5 wherein said non-alkali thickenable polymer is an acrylic emulsion polymer.

11. The composition of claim 5 wherein the alkali thickenable polymer has an acid monomer content of from 6 to 25% by weight of the polymer.

12. The composition of claim 5 wherein the alkaline agent is monobasic.

13. The composition of claim 12 wherein the monobasic alkaline agent is selected from ammonium and alkali metal hydroxides.

14. The dressing composition of claim 5 wherein said composition further comprises a solvent capable of inhibiting the time rate of film formation of the composition and present in an amount sufficient to allow adequate time for the composition to be suitably applied to a substrate.

15. The composition of claim 14 wherein the solvent is water soluble and has a vapor pressure at room temperature lower than that of water.

16. The composition of claim 15 wherein the solvent is a short-chain diol.

17. The composition of claim 16 wherein the solvent is ethylene glycol.

18. The composition of claim 5 further comprising a pigment component.

19. The composition of claim 18 wherein said pigment is present in sufficient amount to render the cured composition with sufficient opacity to obscure the substrate surface.

20. The composition of claim 5 further comprising a coalescing aid for inhibiting the cracking of the composition when cured.

21. The composition of claim 20 wherein said coalescing aid is selected from the group consisting of diacetone alcohol and Butyl Cellosolve.

22. The composition of claim 5 further comprising a plasticizer.

23. The composition of claim 5 wherein said composition further comprises a microbicide.

24. A tile grout dressing composition capable of selectively adhering to grout surfaces and forming on adherable grout surfaces a non-porous, stain resistant, washable layer when cured, said composition comprising
   i. a high molecular weight polymer in the form of an emulsion which is not alkali-thickenable, which emulsion is destabilized in the presence of polyvalent cations, said polymer selected from the group consisting of polymers of carboxylic acids, polymers of esters of carboxylic acids, and copolymers of a carboxylic acid or ester of a carboxylic acid with one or more monomers from the group consisting of the carboxylic acids, esters of carboxylic acids, acrylonitriles, acrylamides, aromatic compounds and alkenes, said polymer characterized as being room-temperature curable and forming a water-resistant film when cured;
   ii. an alkali-thickenable high molecular weight polymer capable of substantially increasing the viscosity of the composition as its pH is increased above neutral pH, said polymer in the form of a colloidal dispersion or emulsion of polymer particles which dispersion or emulsion is destabilized in the presence of polyvalent cations, said polymer selected from the group consisting of polymers of carboxylic acids, polymers of esters of carboxylic acids, and copolymers of a carboxylic acid or ester of a carboxylic acid with one or more monomers from the group consisting of the carboxylic acids, esters of carboxylic acids, acrylonitriles, acrylamides, aromatic compounds and alkenes, said polymer characterized as being room temperature curable and forming a water-resistant film when cured;
   iii. an alkaline agent wherein the cation or cations of said agent are mono-valent and said alkaline agent is present in sufficient amounts to cause the alkali-thickenable polymer to increase the viscosity of the composition;
   iv. water; and
   v. a solvent having a vapor pressure at room temperature lower than that of water and capable of inhibiting the time rate of film formation of the composition and present in an amount sufficient to allow adequate time for the composition to be suitably applied to a substrate;
wherein the total weight of polymer solids is in the range of 5–60% by weight of the total composition, at least 5% by weight of the total polymer solids is the polymer in the form of an emulsion, and the volatile components comprise at least 20% by weight of the composition, and wherein the composition has a thixotropic rheology and a viscosity which is greater than about 50,000 cps at 70° F.

25. The composition of claim 24 wherein the non-alkali thickenable polymer is a copolymer wherein at least one of the monomers present is selected from the group consisting of acrylic acid, homologues of acrylic acid, esters of acrylic acid, and esters of homologues of acrylic acid.

26. The composition of claim 24 wherein the alkali thickenable polymer is in the form of a sol of colloidal polymer particles, said polymer having an acid monomer content of from 6 to 25% by weight of the polymer.

27. The composition of claim 24 wherein the solvent is a short-chain diol.

28. The composition of claim 24 further comprising a pigment component present in a sufficient amount to render the cured composition with sufficient opacity to obscure a substrate surface on which it is applied, and wherein the weight ratio of total polymer solids to pigment component is 1:1 or greater.

29. The composition of claim 24 further comprising a coalescing aid or plasticizer or both.

30. The composition of claim 24 wherein said composition further comprises a microbicide.

* * * * *

UNITED STATES PATENT OFFICE
CERTIFICATE OF CORRECTION

Patent No. 4,055,529     Dated October 25, 1977

Inventor(s) David R. Burley

It is certified that error appears in the above-identified patent and that said Letters Patent are hereby corrected as shown below:

Column 1, line 13, "tiem" should read --time--; line 52, "inculsion" should read --inclusion--; line 54, "jont" should read --joint--; line 56, "diret" should read --dirt--; line 66, "avaliable" should read --available--.

Column 2, line 8, "compositons" should read --compositions--.

Column 3, line 23, "th" should read --the--; line 35, "ivention" should read --invention--; line 36, "non-pourous" should read --non-porous--; line 41, "chemcial" should read --chemical--; line 42, "Chemcially" should read --Chemically--; lines 49, 53, 63, each occurrence, "chemcial" should read --chemical--.

Column 4, line 23, "chemcially" should read --chemically--; line 28, "ucured" should read --uncured--; line 57, "joinnt" should read --joint--.

Column 5, line 44, "alkalithickenable" should read --alkali-thickenable--; Col. 6, line 30, "the" should read --and--.

Column 7, line 16, "Rhophex" should read --Rhoplex--; line 38, "form" should read --from--; line 58, "the" should read --The--; line 68, before the word "emulsion" insert the word --the--.

UNITED STATES PATENT OFFICE
CERTIFICATE OF CORRECTION

Patent No. 4,055,529  Dated October 25, 1977

Inventor(s) David R. Burley

It is certified that error appears in the above-identified patent and that said Letters Patent are hereby corrected as shown below:

Column 8, lines 5-6, "undersirable" should read --undesirable--; line 47, "Comparny" should read --Company--.
Column 9, line 10, "is" should read --if--; line 19, "sensitivty" should read --sensitivity--; line 58, "radio" should read --ratio--.
Column 10, line 30, "titantium" should read --titanium--; line 60, "bcteriocides" should read --bacteriocides--.
Column 11, lines 13, 45, each occurrence, "cememtitious" should read --cementitious--; line 53, "beter" should read --better--.
Column 12, line 7, "wear" should read --water--; line 35, 45, each occurrence, "Brookfied" should read --Brookfield--; line 45, "4when" should read --4 when--; line 53, "Bu" should read --By--.
Column 14, line 7, "visosity" should read --viscosity--; line 61, "were" should read --was--.
Column 16, line 36, "is" should read --are--.
Column 18, lines 14-15, "Exammple" should read --Example--.
Column 20, line 34, "peviously" should read --previously--; line 55, "appied" should read --applied--.

UNITED STATES PATENT OFFICE

CERTIFICATE OF CORRECTION

Patent No. 4,055,529  Dated October 25, 1977

Inventor(s) David R. Burley

It is certified that error appears in the above-identified patent and that said Letters Patent are hereby corrected as shown below:

Column 21, line 5 [Claim 1], "nertral" should read --neutral--.

Column 22, lines 6-7 [Claim 5], "alkalithickenable" should read --alkali-thickenable--; line 9 [Claim 5], "wherein" should begin a new paragraph; line 12 [Claim 5], "viscofity" should read --viscosity--.

Signed and Sealed this

Sixth Day of February 1979

[SEAL]

Attest:

RUTH C. MASON
Attesting Officer

DONALD W. BANNER
Commissioner of Patents and Trademarks